(12) United States Patent
Liu et al.

(10) Patent No.: US 7,091,902 B2
(45) Date of Patent: Aug. 15, 2006

(54) SYSTEMS AND METHODS FOR CHARACTERIZING THE COVERAGE OF AD HOC SENSOR NETWORKS

(75) Inventors: Juan Liu, Milpitas, CA (US); Xenofon Koutsoukos, Franklin, TN (US)

(73) Assignee: Xerox Corporation, Stamford, CT (US)

( * ) Notice: Subject to any disclaimer, the term of this patent is extended or adjusted under 35 U.S.C. 154(b) by 253 days.

(21) Appl. No.: 10/736,601

(22) Filed: Dec. 17, 2003

(65) Prior Publication Data

US 2005/0134499 A1 Jun. 23, 2005

(51) Int. Cl.
G01S 7/40 (2006.01)
G01S 13/04 (2006.01)
G01S 15/04 (2006.01)
G01S 13/00 (2006.01)
G01S 15/00 (2006.01)

(52) U.S. Cl. .................. 342/174; 342/27; 342/165; 342/173; 342/175; 342/195; 367/87; 367/93; 340/540; 340/541; 340/552; 702/85; 702/104

(58) Field of Classification Search .............. 342/27, 342/28, 52–60, 82, 89, 90, 165–175, 188–197, 342/73–81; 367/87, 93, 94, 117; 340/853.1, 340/856.3, 856.4, 870.01, 870.16, 870.17, 340/870.28, 870.3–870.38, 540–686.6, 505, 340/538; 702/22, 104, 183, 189, 85; 385/143
See application file for complete search history.

(56) References Cited

U.S. PATENT DOCUMENTS

| | | | | |
|---|---|---|---|---|
| 5,402,101 A * | 3/1995 | Berger et al. | ............... | 340/505 |
| 5,552,791 A * | 9/1996 | Metal | .................. | 342/174 |
| 5,610,393 A * | 3/1997 | Klimcak et al. | ............. | 385/143 |
| 6,013,108 A * | 1/2000 | Karolys et al. | .............. | 702/189 |
| 6,212,471 B1 | 4/2001 | Stiles et al. | | |
| 6,297,763 B1 | 10/2001 | Thomson et al. | | |
| 6,594,602 B1 * | 7/2003 | Schultz | ................... | 702/104 |
| 6,831,550 B1 * | 12/2004 | Orita et al. | ................ | 340/538 |
| 6,839,636 B1 * | 1/2005 | Sunshine et al. | ............ | 702/22 |
| 6,889,165 B1 * | 5/2005 | Lind et al. | ................... | 702/183 |

FOREIGN PATENT DOCUMENTS

EP 0721099 A2 * 7/1996

OTHER PUBLICATIONS

U.S. Appl. No. 10/655,301, filed Sep. 5, 2003, Reich et al.
New U.S. Appl. No. 10/736,748, filed Dec. 17, 2003, Liu et al.
Meguerdichian et al., "Coverage Problems in Wireless Ad-hoc Sensor Networks" IEEE Infocom 2001, vol. 3, pp. 1380-1387, Apr. 2001.

* cited by examiner

Primary Examiner—Bernarr E. Gregory
(74) Attorney, Agent, or Firm—Oliff & Berridge PLC

(57) ABSTRACT

The systems and methods according to this invention disclose that coverage for an ad hoc sensor network is fundamental to the deployment and utilization of such networks. The invention provides a method which characterizes the coverage of an ad hoc sensor network by defining a sensing field over the space within which the physical phenomenon of interest occurs. Its value at any given point reflects the ability of the sensor network to estimate the phenomenon and/or event, of interest at this point. A statistical method is presented to determine such a field based on sensor layouts and sensor models. The system and methods of the invention define well monitored regions and sensor holes, information that can be used to characterize the quality of service that the network provides for different applications. A graphical user interface may be provided to display this information to the user for monitoring in health management of the network. The systems and methods of the invention apply to fixed as well as mobile sensors.

10 Claims, 8 Drawing Sheets

SYSTEMS AND METHODS FOR CHARACTERIZING THE COVERAGE OF AD HOC SENSOR NETWORKS

STATEMENT OF GOVERNMENT FUNDING

The work described in this application was supported by funding from the Defense Advanced Research Projects Agency under DARPA contract number F30602-00-C-0139. The government may have certain rights to this invention.

BACKGROUND OF THE INVENTION

1. Field of Invention

The systems and methods of this invention are directed to ad hoc sensor networks.

2. Description of Related Art

Ad hoc sensor networks have potential impact on many applications such as intelligent infrastructures, environmental monitoring, and battlefield monitoring. The characterization of a network's ability to perform a sensing task is a fundamental problem for the deployment and use of such systems. Traditional sensors are characterized by specifications such as range, resolution, and accuracy. These specifications are used to decide if a sensor is suitable for the task and system at hand. The simplicity and elegance of these specifications make the use of individual sensors a very easy task. Similar specifications for sensor networks currently do not exist and extensive testing is necessary to assess the capability of sensor networks and then their suitability for a particular task.

One approach which tackles coverage problems of sensor networks is described by Meguerdichian et al., "Coverage Problems in Wireless Ad Hoc Sensor Networks," IEEE Infocom 2001, vol. 3, pp. 1380–1387, April 2001. This publication uses the distance from the sensor nodes as the only metric that characterizes the sensing ability. It does not take into consideration any sensor characteristics. Accordingly, this results in the same coverage characterization independent of the type and capabilities of the individual sensors used in the network. Moreover, this approach computes a maximal breach path using a geometrical characterization that is not necessarily related to the sensing capabilities of the network.

U.S. Pat. No. 6,212,471 to Stiles et al. discloses dynamic optical sensor employment for searching an area. U.S. Pat. No. 6,297,763 to Thomson et al. discloses a method for optimizing the coverage area of a sensor. In both of these patents, coverage characterization of sensing systems is of great significance.

SUMMARY OF THE INVENTION

The systems and methods according to various exemplary embodiments of this invention use the concept of a sensing field for specifying the ability of a sensor network to measure a physical phenomenon of interest. In various exemplary embodiments of the systems and methods according to this invention, a sensing field is defined over the space in which the phenomenon of interest needs to be estimated. For example, if one is interested in measuring the temperature of an object, then the sensing field may be defined over a set of possible temperature values. If, for example, one is interested in some phenomenon in a physical location domain, the sensing field may be defined with respect to that domain. The value of the sensing field at any given point reflects the ability of the sensor network to estimate the physical phenomenon of interest at that point.

Various exemplary embodiments of the systems and methods according to this invention use a statistical method that determines a sensing field based on sensor layouts and the sensing models, thereby defining well-monitored regions and sensor holes in the sensor network. This information is used to characterize the quality of service that the sensor network provides for different applications. A graphical user interface may be used to display this information to the user for monitoring and health management of the sensor network.

One object of the systems and methods according to this invention is to specify coverage of a sensor network using a sensing field.

Another object of the systems and methods according to this invention is for the sensing field to characterize the ability of the sensor network to measure a physical phenomenon.

Various exemplary embodiments of the systems and methods according to this invention display the sensing field, for example, using a graphical user interface, thereby providing a simple and intuitive way to monitor the coverage of the sensor network.

Various exemplary embodiments of the systems and methods according to this invention include specification of the coverage using a sensing field that takes into consideration the sensor layout and the sensing models. Given the sensor network layout and sensing models, the resulting sensing field coverage obtained by the exemplary embodiments of the systems and methods of the invention, accurately represents the ability of the sensor network to measure physical phenomena.

The sensing field aspect of the various exemplary embodiments of the systems and methods according to this invention may be used to solve various problems in sensor networks, such as, for example, sensor deployment, sensor localization, and sensor health management. The sensing field may also be used from an adversarial point of view, to find weak points and escape detection.

Other features and advantages of this invention will become apparent from the following detailed description of exemplary embodiments.

BRIEF DESCRIPTION OF THE DRAWINGS

Various exemplary embodiments of this invention will be described in detailed with reference to the following drawings, wherein.

DETAILED DESCRIPTION OF EXEMPLARY EMBODIMENTS

Figure 1:
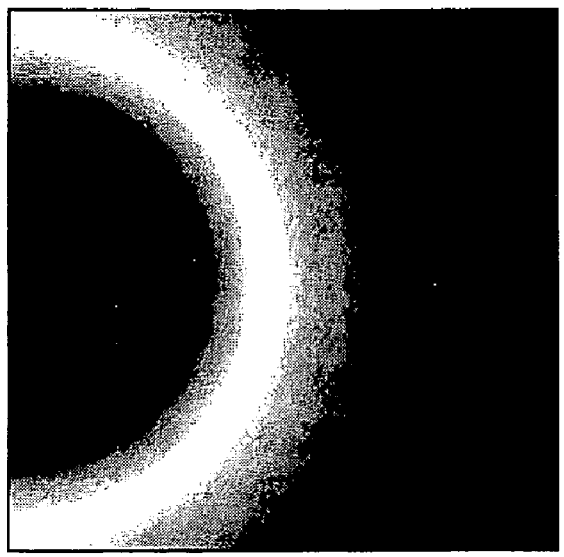
FIG. 1 is an example of a sensor observational model that plots target location distribution based on a single amplitude measurement.

In one exemplary embodiment of event localization problem solving, according to the systems and methods of this invention, a network with heterogeneous sensors, range, and angle is considered, and a sensing field is determined that specifies the ability of the sensor network to estimate the position at every location. Various exemplary embodiments of the systems and methods according to this invention make such a determination based on the uncertainty of the estimation and the quality of the sensing model. The notation of estimation uncertainty and sensing quality is universal over various sensor network applications; therefore, the sensing field and the determination described herein are not limited to any particular application, but rather apply generally to a wide variety of sensor network applications.

In exemplary embodiments of event localization, such as, for example, target localization, according to the systems and methods of the invention, it is reasonable to assume that the target is present in a location domain. The domain may be, for example, a one dimensional road, a two-dimensional terrain, or a three-dimensional space. One goal of localization is to locate the target in the domain with some accuracy based on the observed data. Sensors are used to gather information about the target from various locations. By exploiting the spatial diversity of the sensors, one can achieve good localization performance, which would otherwise be unachievable using any single sensor.

Various exemplary embodiments of the systems and methods according to this invention determine in which regions an event, such as, for example, a target, can be easily detected, and in which regions the event, e.g., target, can possibly hide, even though the target has never been present in the location domain, based on the sensor layouts and the sensing models. Information regarding the sensor layouts and the sensing models is very useful for randomly deployed sensor networks. Once the sensor locations are calibrated, a user may obtain a good understanding of the strengths and weaknesses of the sensor network's sensing capabilities, and thus may adapt the sensor network accordingly. Various exemplary embodiments of the systems and methods according to this invention also permit the user to adjust the sensor layout to provide even coverage across a domain or entire field, or to focus coverage to a specific region of interest, depending upon practical situations.

Sensor networks usually contain a large number of sensors spread over a region. For each sensor, a sensing field may be defined. To define a statistical tracking system that characterizes the pointwise ability of a network of sensors to measure a physical phenomenon of interest, the following two factors may be considered. The first factor is that the larger the uncertainty of the physical phenomenon, such as the location of the target in localization applications, the weaker the sensing ability. The second factor is the degree to which the actual sensing model fits the statistical assumptions. Various exemplary embodiments of the systems and methods according to this invention determine and illustrate these two factors with examples. The definition and determination of the sensing ability field according to exemplary embodiments of the systems and methods of this invention are applicable to, but not restricted to, the examples discussed below.

To determine the first factor, the systems and methods according to this invention in one exemplary embodiment use $L_0$ to denote the true target location, and L to denote the sensor measurement of target location. Uncertainty reflects the compactness of the conditional density $p(L/L_0)$. For a one-dimensional case, the uncertainty can be measured by the variance of $p(L/L_0)$. For higher dimensional cases, the determinant or the trace of the covariance matrix may be used. The former measures the volume of the probability mass, whereas the latter measures the circumference of the probability mass. Depending upon the application, a user may choose the appropriate measure. In general, the higher the uncertainty, the more difficult it is to estimate $L_0$ from L.

The second factor may be expressed by the goodness of fit of statistical assumptions. The statistical system according to one exemplary embodiment makes exemplary simplifying assumptions about physical reality. For example, with respect to analysis and computation, sensing models often are provided in parametric forms. For tracking, a Gaussian assumption is common. For example, Kalman filtering assumes Gaussian observation modes. Linear minimum mean-squared error (LMMSE) estimators are optimal for Gaussian cases, and serve well as an approximation for non-Gaussian distributions. In reality, the actual sensing model may deviate from the assumptions. To measure the difference between an assumed model $q(L/L_0)$ and the actual model $p(L/L_0)$, the information-theoretic Kullback-Leibler difference may be used. The Kullback-Leibler difference, is defined in equation 1, below.

$$KL(p, q) = \int \log(p/q) dp \qquad (1)$$

The Kullback-Leibler divergence is known to those skilled in the mathematical arts and is described, for example, by S. Kullback, Information Theory and Statistics, John Wiley & Sons, New York, 1959. The Kullback-Leibler divergence measures the number of bits to describe the discrepancy between p and q. Alternatively, the Hellinger divergence, which is specified by equation 2, below, and which is similar to a mean-squared error (MSE) measure, may be used.

$$H(p, q) = \int [\text{sqrt}(p) - \text{sqrt}(q)]^2 dp \qquad (2)$$

These metrics tell how well the assumption $q(L/L_0)$ fits the actual sensing physics. A good fit would justify the use of a tracking algorithm built on the assumption q. A bad fit would suggest otherwise.

Based on a consideration of these two factors, a simplified exemplary embodiment is described of the systems and methods of this invention is described below, which assumes that a sensor is located at the origin (0,0) without loss of generality, and that the sensor is microphone based, with a measurement of the amplitude Z and a measurement of the direction-of-arrival (DOA) measurement data.

The physical observation model consists of the following:

First, conditioned on a true location $L_0$, the amplitude measurement Z and the estimated direction of arrival $\theta$ are independent.

Second, given $L_0$, $Z=A/r(L_0)+n$, where $r(L_0)$ is the distance from $L_0$ to the sensor location (the origin), A is the sound source amplitude, and n is the measurement noise, assuming that the noise is independently and identically distributed (iid) with a Gaussian distribution with zero mean, and variance $\sigma_n^2$. From this amplitude measurement, the sensor infers the target distance as $r=A/Z$.

Third, given $L_0$, $\theta=\theta_{0+w}$, where $\theta_0=a\tan2(L_{0,y}, L_{0,x})$ is the angle from the sensor to the true target location, and w is measurement noise, assuming that the noise is independently and identically distributed (iid) with a Gaussian distribution with zero mean, and variance $\sigma_w^2$.

The target location may be determined from the range and direction measurements as $L_x=r\cos(\theta)$ and $L_y=r\sin(\theta)$. From the sensing field model, the conditional probability may be derived as:

$$p(L/L_0)=p(L_x,L_y/L_0)=p(r;\theta/L_0)\cdot r=p(r/L_0)\cdot\sqrt{L_x^2+L_y^2}$$

Figure 2:
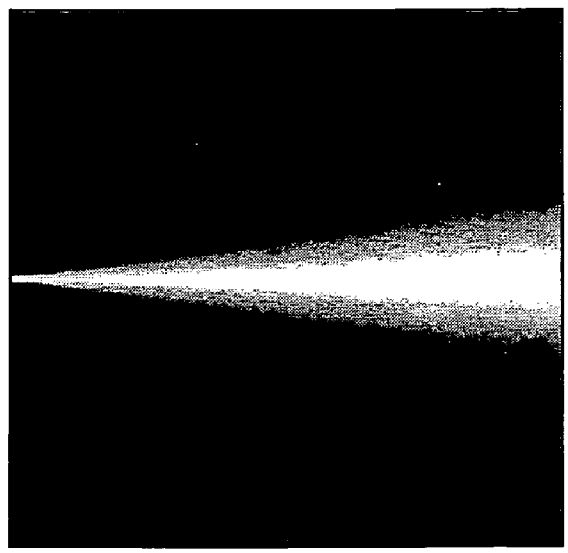
FIG. 2 is an example of a sensor observational model that plots the target location distribution based on a direction-of-arrival measurement.
Figure 3:
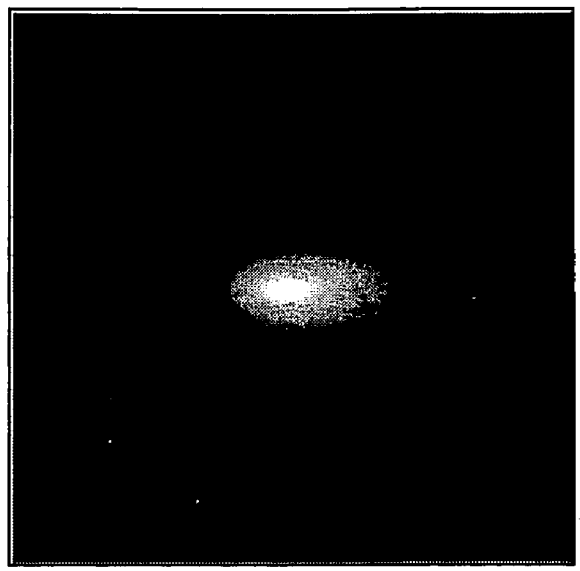
FIG. 3 is a plot of overall target location distribution according to an exemplary embodiment according to the systems and methods of this invention.
Figure 4:
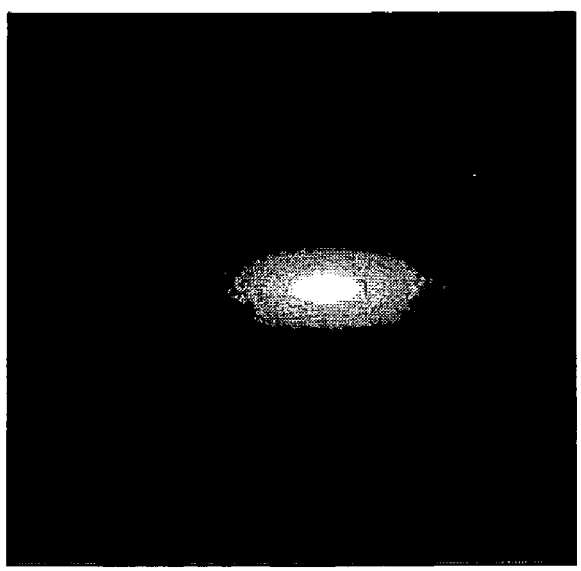
FIG. 4 is a plot of a best Gaussian fit to the overall target location as shown in FIG. 3.

FIGS. 1 and 2 plot e one example of a distribution of $p(r/L_0)$ and $p(\theta/L_0)$ as a function of $L_x$ and $L_y$, for $L_0=(30, 0)$, $A=80$, $Cn=0.5$, and $\sigma_w=5$ degrees. The overall distribution $p(L/L_0)$ is plotted in FIG. 3. Note that it appears to be a comet around the true location $L_0$. FIG. 4 is the Gaussian fit of the aforementioned overall distribution. Compared to the actual distribution, the Gaussian fit is symmetric and centered at $L_0$. In this case, the Gaussian fit approximates the original distribution $p(L/L_0)$ reasonably well.

Figure 5:
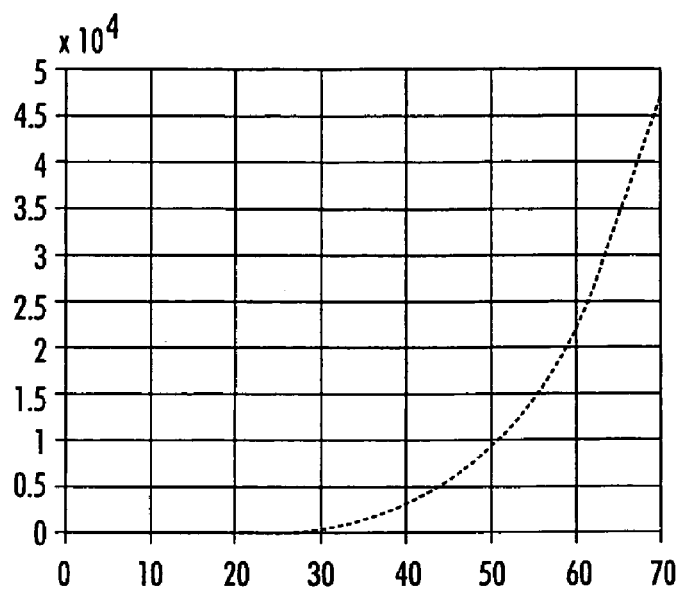
FIG. 5 is an example of a plot of the sensing uncertainty, measured as the determinant of covariance matrix, as a function of target distance according to an exemplary embodiment of the systems and methods of this invention.

Given this example of the sensor model, the sensing field may be determined. The sensing field should be symmetric around the sensor location. Accordingly, only the target locations $L_0=(l_0, 0)$ for $L_0$ in the positive half axis need be determined. For illustration purposes, the uncertainty may be measured as the determinant of the covariant matrix. FIG. 5 illustrates that the uncertainty increases with the radius $L_0$. For this sensing model, when the target is far away, the signal is buried in noise. Therefore, the location measurement is less accurate.

Figure 6:
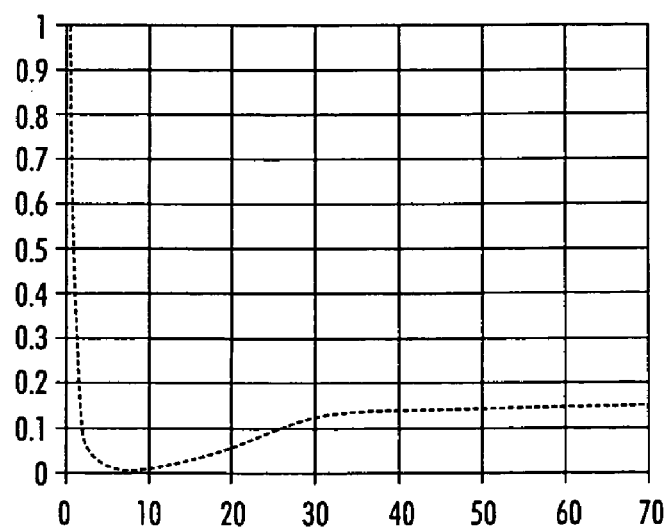
FIG. 6 is an example of a plot of the goodness of fit, measured as the Kullback-Leibler distance as a function of target distance, according to an exemplary embodiment of the systems and methods of this invention.

The goodness of fit may be measured as the Kullback-Leibler divergence, as illustrated in FIG. 6. This divergence is small for a mid-range of $L_0$, and large outside the mid-range. For a small $L_0$, since the target is very close by, the signal-to-noise ratio (SNR) is high. Therefore, $p(r/L_0)$ is essentially a very thin ring, and $p(L/L_0)$ is a thin arc which cannot be well approximated by a Gaussian fit. For very large $L_0$, the tail of the comet becomes longer, and the Gaussian fit is not accurate.

The sensing ability characterization for single sensors may be combined to generate a sensor ability field for a sensor network which includes multiple sensors. The Kullback-Leibler divergence field of each sensor may be superimposed to measure the goodness of fit. The uncertainty of target location with respect to combination of sensors is measured as the determinant of the covariance matrix, and the sensing quality is inversely proportional to the uncertainty. Hence, the target location uncertainty is measured as 1/det(cov) These approaches may be justified from a Bayesian estimation point of view. The regions with low uncertainty and low divergence values are considered to be well monitored by the sensor network. The regions with high uncertainty and high divergence values are considered to be sensor holes. In this manner, the ability of the sensor network may be accurately characterized.

The systems and methods according to this invention are not restricted to target localization issues. Various exemplary embodiments according to the systems and methods of this invention which characterize a sensor network's ability by measuring the uncertainty of the estimate and the goodness of fit of statistical assumptions, although fundamental in sensing applications, may also be applied to very different scenarios such as temperature estimation or chemical monitoring. Further, various exemplary embodiments of the systems and methods according to this invention may be applied to not only fixed sensors, but to mobile sensors as well.

For mobile sensors, sensor locations may be acquired from some location service, for example, from the readings of GPS devices. The location and sensing model information can be periodically aggregated to some central computation center, and by the same method, the sensing field can be computed. Assuming the sensor nodes move in a continuous fashion, one may design incremental updates to save computation in the updating of the sensing field.

Figure 7:
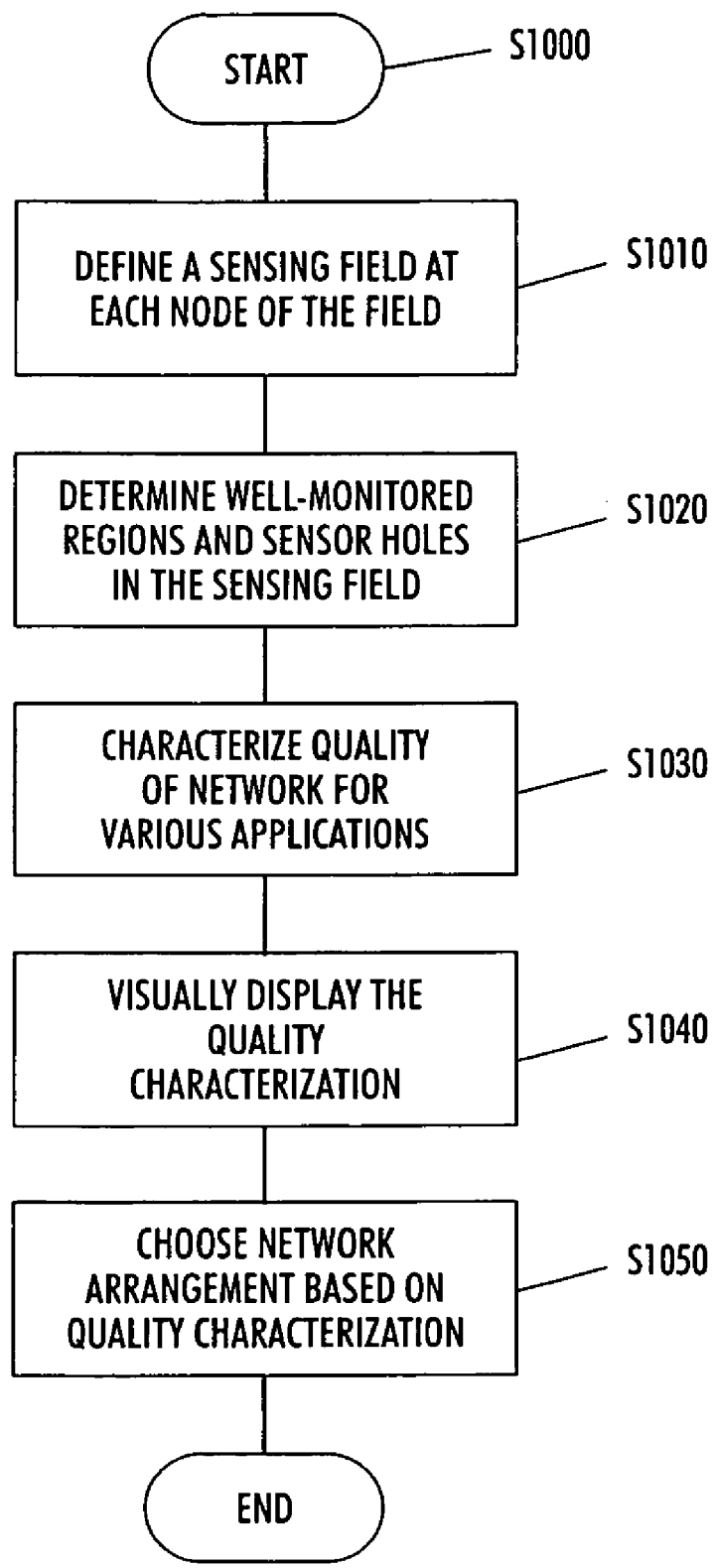
FIG. 7 is a flowchart outlining one exemplary embodiment of a method for choosing a network arrangement according to the systems and methods of this invention.

FIG. 7 is a flowchart which outlines one exemplary embodiment of a method according to this invention for choosing a network arrangement based on a sensing field quality characterization. Control starts in step S1000 and proceeds to step S1010, where a sensing field is defined for each sensor node of the field. Control then proceeds to step S 1020, where a determination is made of well monitored regions and sensor holes in the sensing field.

Control then proceeds to step S1030, where the quality of the network for various applications is characterized.

Control then proceeds to step S1040, where the quality characterization from the previous step is visually displayed, for example, on a graphical user interface. Control then proceeds to step S1050, where a network arrangement based on the sensing field quality characterization previously determined is chosen. Control then proceeds to step S1060, where the process ends.

Various exemplary embodiments of this invention may be implemented on a programmed general purpose computer. However, various exemplary embodiments can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 7, can be used to implement systems and methods of this invention.

Moreover, various exemplary embodiments can be implemented as software executing on a programmed general purpose computer, a special purpose computer, a microprocessor or the like. In this case, the systems and methods of this invention can be implemented as a routine embedded in a printer control system or controller or the like. That is, the systems and methods of this invention can be implemented by physically incorporating them into a software and/or hardware system, such as the hardware and software systems of a personal computer.

Figure 8:
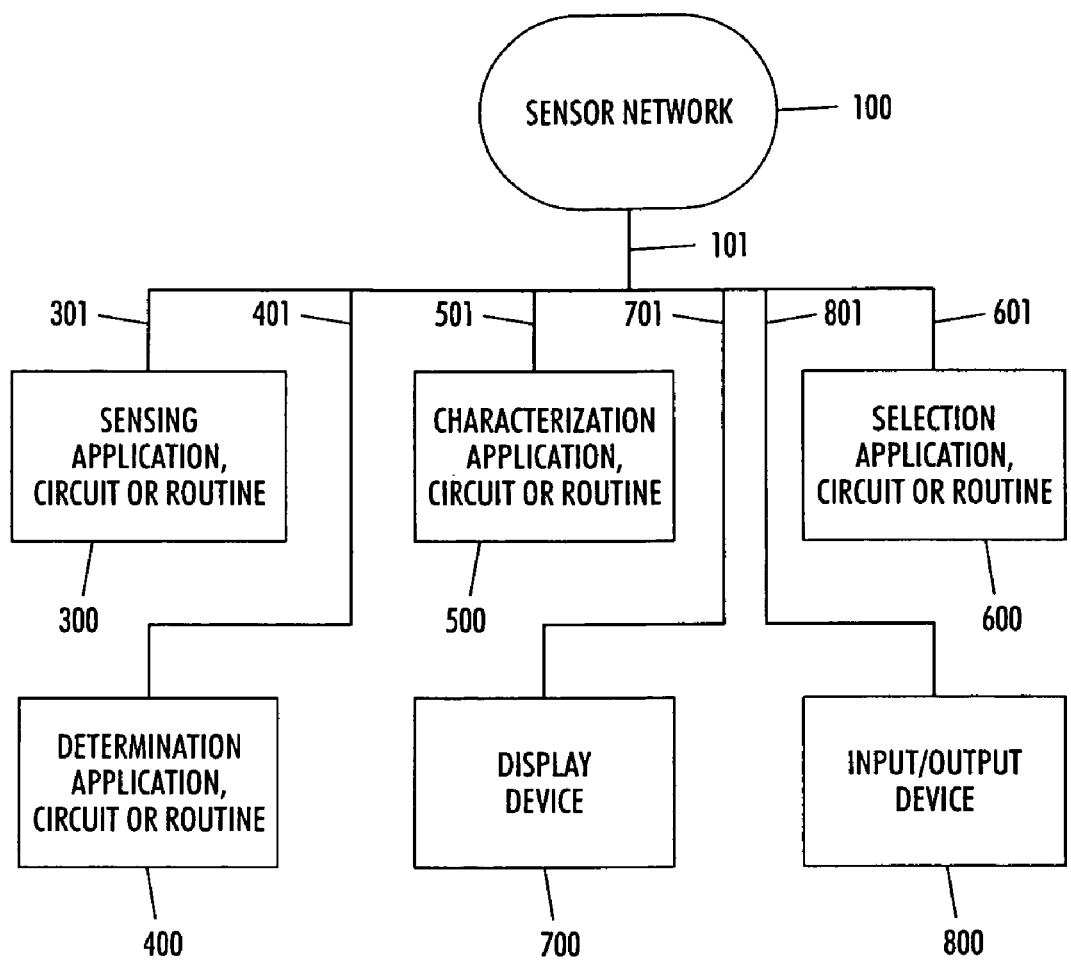
FIG. 8 is a block diagram of an exemplary embodiment of a sensor network system with combined sensing ability characterization, visualization, and application selection according to this invention.

FIG. 8 shows an exemplary embodiment of a system according to this invention. A sensor network 100 is placed in communication with a link or bus 200 via a link 101. Further, a sensing application, circuit or routine 300, a determination application, circuit or routine 400, a characterization application, circuit or routine 500 and a selection application, circuit or routine 600 are placed in communication with the bus 200 via links 301, 401, 501 and 601, respectively.

As discussed above, each sensor node is relatively self sustaining in the sense that each sensor node has its own power supply. Each sensor node also has a central processing unit, memory and communication (transmission and reception) capabilities. Each sensor node may communicate with the sensing application, circuit or routine 300, the determination application, circuit or routine 400, the characterization application, circuit or routine 500 and the selection application, circuit or routine 600 via the bus 200. These applications, circuits or routines are capable of carrying out the functions described above with respect to FIG. 7.

A display device 700 and an input/output device 800 may also be placed in communication with the bus 200 via links 701 and 801, respectively. The display device 700 may be used to display the sensor field quality. The input/output device 800 allows a user to interact with the various applications, circuits and routines. Further, the input/output device 800 may allow a user to interact, either directly or indirectly, with the sensor network 100.

It should be appreciated that each of the applications, circuits or routines shown in FIG. 8 can be implemented as portions of a suitably programmed general purpose computer. Alternatively, each of the applications, circuits or routines shown in FIG. 8 can be implemented as physically distinct hardware circuits within an ASIC, or using a FPGA, a PDL, a PLA, or a PAL, or using discrete logic elements or discrete circuit elements. The particular form each of the applications, circuits or routines shown in FIG. 8 will take is a design choice and will be predictable to those skilled in the art.

Further, it should be appreciated that each of the links shown in FIG. 8 can be implemented as any known or hereafter developed technology or technique that allows communication between components. In particular, the links may be wired or wireless.

Figure 9:
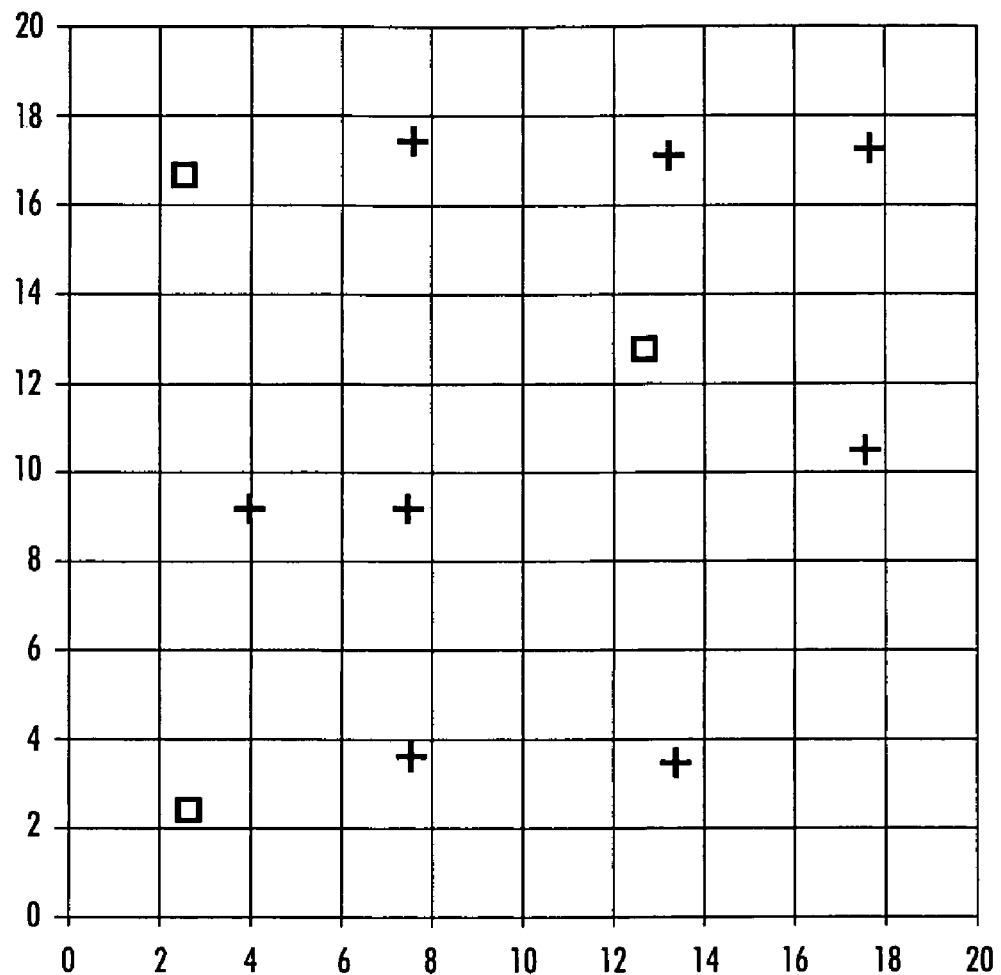
FIG. 9 is an example of a sensor network which has heterogeneous sensor types.

FIG. 9 shows a two-dimensional network sensor layout. The points marked with "+" denote amplitude sensors, such as, for example, acoustic sensors, and assume that the amplitude A equals 40 and the Gaussian amplitude noise of standard deviation $\sigma_{k,\,amp}$ is 0.5. The points marked with squares denote direction-of-arrival (DOA) sensors, and assume that the noise-to-angle measurements have $\sigma_{k,DOA}$ is three degrees.

Figure 10:
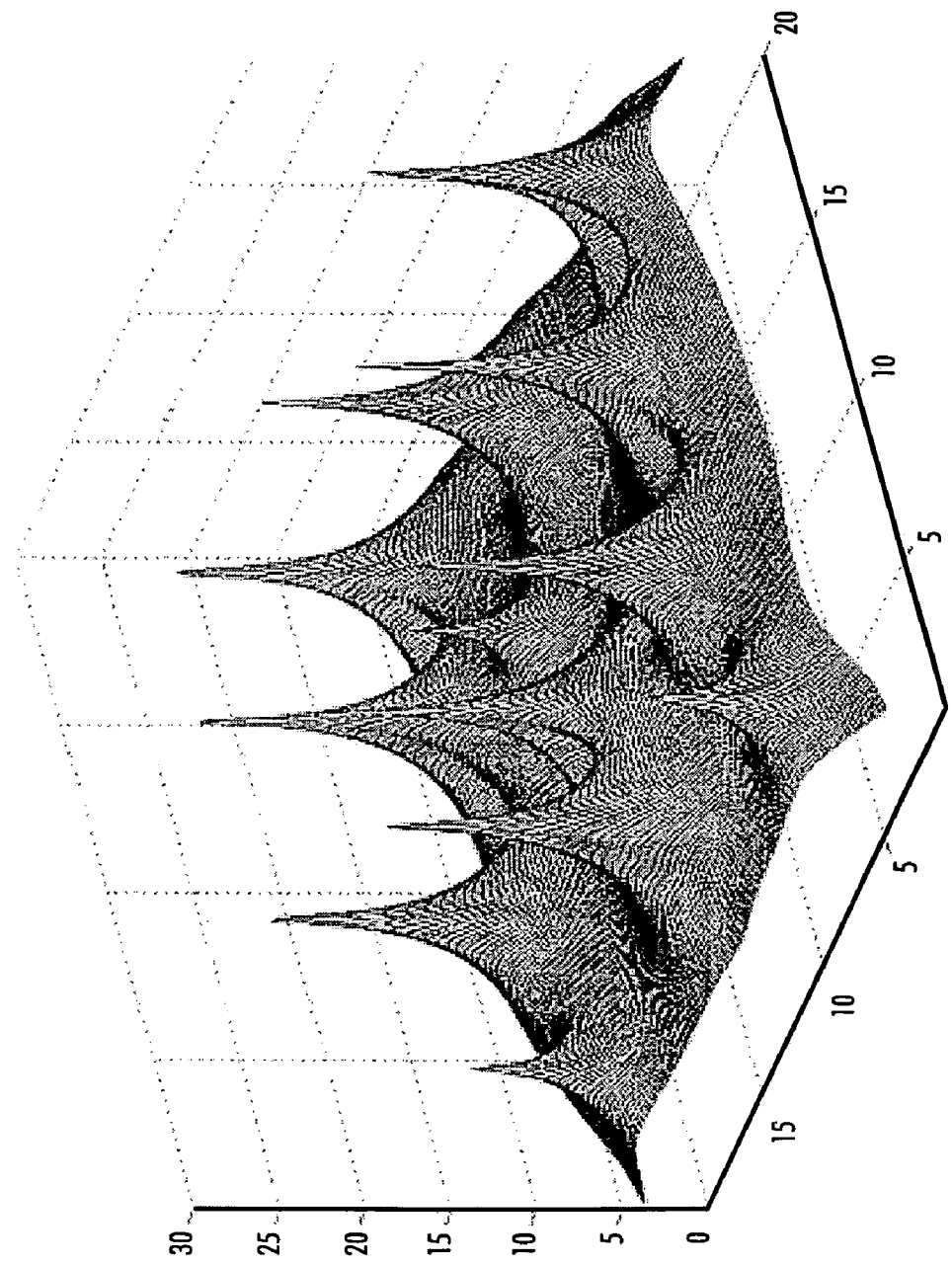
FIG. 10 is an exemplary plot showing the localization uncertainty using all sensors in the sensor network of FIG. 9.

FIG. 10 shows an uncertainty field for the exemplary sensor network of FIG. 9. The uncertainty is measured as the determinant of the Fisher information matrix using all sensors in the sensor field. FIG. 10 is plotted in log scale.

Figure 11:
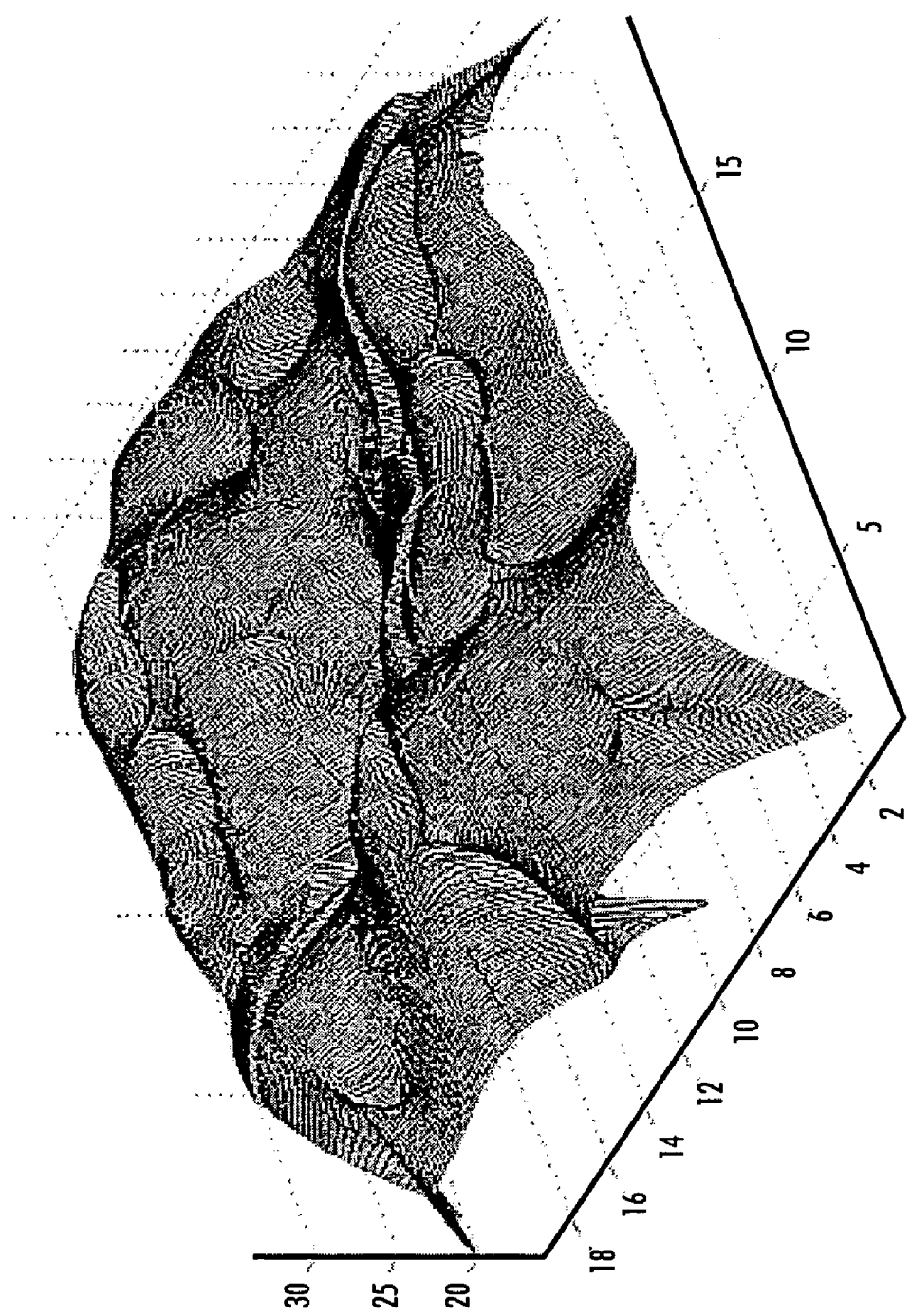
FIG. 11 is an exemplary plot showing the localization uncertainty using only four nearest sensors in the sensor network of FIG. 9.

FIG. 11 shows another uncertainty field using a determination of an instantiation of sensing field based on the Cramer-Rao bound (CRB) of estimation accuracy, or, equivalently, the Fisher information, in sensor networks. FIG. 11 involves the determinant of the distributed Fisher information. Details of the determination may be found in Liu, Juan, et al., "Sensing Field: Coverage Characterization in Distributed Sensor Networks", Proceedings of ICASSP, May 2003.

Sensing field determinations for characterizing the pointwise ability of a sensor network to measure and/or otherwise determine a physical phenomenon of interest may be used as a tool to evaluate the sensor network, and provides a reference to sensor deployment as well as estimation and routing algorithms in sensor networks.

For example, for a randomly deployed sensor network, once the sensor locations/nodes are calibrated, a user can obtain a good sense of the strength and weakness of the sensor network's sensing capabilities, and algorithms can be adapted accordingly. Furthermore, the system's awareness of a target fast approaching a hole in the sensor network may trigger algorithms to trigger sensors further away, call for more extensive sensor collaboration, and planning for limited resources with sufficient look-ahead capabilities.

As another example, in a mobile sensor network, where adjusting sensor layout is important, individual sensors can be adjusted to provide relatively even sensor coverage across the field, or to focus coverage on specific regions of interest to satisfy user requirements.

While this invention has been described in conjunction with the exemplary embodiments outlined above, it is evident that many alternatives, modifications and variations will be apparent to those skilled in the art. Accordingly, the exemplary embodiments of this invention, as set forth above, are intended to be illustrative and not limiting. Various changes may be made without departing from the spirit and scope of this invention.

What is claimed is:

1. A method of selecting a network directional sensor arrangement for detecting at least one physical phenomenon based on a sensing ability characterization, comprising:
    defining a sensing field at each point in the domain of the at least one physical phenomenon;
    determining well monitored regions and sensor holes in each sensing field;
    determining the sensing ability characterization of the network sensor arrangement;
    visually displaying the sensing ability characterization; and
    selecting at least one sensor network arrangement based on the sensing ability characterization.

2. The method of claim 1, wherein the sensing field at each sensor node is defined based on an inverse relationship between event location uncertainty and the ability to sense at least one physical phenomenon at that location.

3. The method of claim 2, wherein the event location comprises target location.

4. The method of claim 1, wherein the sensing field at each sensor node is defined based on a goodness of fit of statistical assumptions about a physical state of each sensor node.

5. The method of claim 1, further comprising:
    determining blind spots in each sensing field.

6. A system for selecting a network directional sensor arrangement based on a sensing ability characterization, comprising:
    a sensing application, circuit or routine that defines a sensing field at each node of the network sensor arrangement;
    a determination application, circuit or routine that determines well monitored regions and sensor holes in the network sensor arrangement;
    a characterization application, circuit or routine that determines the sensing ability characterization of the network sensor arrangement;
    a display device that visually displays the sensing ability characterization; and
    a selection application, circuit or routine that selects a network sensor arrangement based on the sensing ability characterization.

7. The system of claim 6, wherein the sensing application, circuit or routine defines the sensing field at each sensor node based on an inverse relationship between event location uncertainty and the sensing ability of sensor network.

8. The system of claim 7, wherein the event location comprises target location.

9. The method of claim 6, wherein the sensing application, circuit or routine defines the sensing field at each sensor node based on a goodness of fit of statistical assumptions about a physical state of each sensor node.

10. A method of determining the health of a directional sensor network, comprising:
- a sensing mechanism that defines a sensing field at each node of the network sensor arrangement;
- a determination mechanism that determines well monitored regions and sensor holes in the network sensor arrangement;
- a characterization mechanism that determines a sensing ability characterization of the network sensor arrangement;
- a display device that visually displays the sensing ability characterization; and
- a mechanism that selects a network sensor arrangement based on the sensing ability characterization.

* * * * *

UNITED STATES PATENT AND TRADEMARK OFFICE
CERTIFICATE OF CORRECTION

PATENT NO. : 7,091,902 B2
APPLICATION NO. : 10/736601
DATED : August 15, 2006
INVENTOR(S) : Juan Liu and Xenofon Koutsoukos It is certified that error appears in the above-identified patent and that said Letters Patent is hereby corrected as shown below:

Title page, item (73) Assignee:
    change: "Xerox Corporation, Stamford, CT (US)"
    to: --Palo Alto Research Center, Incorporated, Palo Alto, CA (US)--

Signed and Sealed this

Nineteenth Day of February, 2008

JON W. DUDAS
*Director of the United States Patent and Trademark Office*